US010180901B2

(12) United States Patent
Taylor (10) Patent No.: US 10,180,901 B2
(45) Date of Patent: Jan. 15, 2019

(54) APPARATUS, SYSTEM AND METHOD FOR MANAGING SPACE IN A STORAGE DEVICE

(71) Applicant: Oracle International Corporation, Redwood City, CA (US)

(72) Inventor: Eric Carl Taylor, Superior, CO (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 95 days.

(21) Appl. No.: 13/769,749

(22) Filed: Feb. 18, 2013

(65) Prior Publication Data

US 2014/0115293 A1      Apr. 24, 2014

Related U.S. Application Data

(60) Provisional application No. 61/716,208, filed on Oct. 19, 2012.

(51) Int. Cl.
| | |
|---|---|
| *G06F 12/02* | (2006.01) |
| *G06F 17/30* | (2006.01) |
| *G06F 3/06* | (2006.01) |

(52) U.S. Cl.
CPC ........ *G06F 12/023* (2013.01); *G06F 12/0238* (2013.01); *G06F 12/0292* (2013.01); *G06F 17/30138* (2013.01); *G06F 3/0608* (2013.01); *G06F 2212/20* (2013.01); *G06F 2212/7205* (2013.01)

(58) Field of Classification Search
CPC .... G06F 12/02; G06F 12/023; G06F 12/0238; G06F 12/0246; G06F 12/06; G06F 12/0646; G06F 12/0676; G06F 12/0866; G06F 12/0873; G06F 13/14; G06F 13/16; G06F 13/36; G06F 13/42; G06F 13/4204; G06F 13/426; G06F 13/4282
USPC .......... 711/103, 113, 161, 162, 16, 170–173; 707/821–828; 718/140
See application file for complete search history.

(56) References Cited

U.S. PATENT DOCUMENTS

| | | | |
|---|---|---|---|
| 5,765,193 A * | 6/1998 | Rosich ................ | G06F 12/0804 711/136 |
| 6,360,233 B1 | 3/2002 | Houldsworth | |
| 6,442,601 B1 * | 8/2002 | Gampper ................ | H04L 29/06 709/218 |
| 6,539,464 B1 * | 3/2003 | Getov ................... | G06F 9/5016 711/147 |
| 7,299,384 B1 | 11/2007 | Rodriguez-Rivera et al. | |
| 7,392,363 B2 | 6/2008 | Fleming et al. | |
| 7,610,468 B2 | 10/2009 | Madisetti | |

(Continued)

*Primary Examiner* — Jared I Rutz
*Assistant Examiner* — Stephanie Wu
(74) *Attorney, Agent, or Firm* — Kilpatrick Townsend & Stockton, LLP (57) ABSTRACT

Aspects of the present disclosure disclose systems and methods for managing space in storage devices. In various aspects, the disclosure is directed to providing more efficient method for managing free space in the storage system, and related apparatus and methods. In particular, the system provides for freeing blocks of memory that are no longer being used based on the information stored in a file system. More specifically, the system allows for reclaiming of large segments of free blocks at one time by providing information on aggregated blocks that were being freed to the storage devices.

16 Claims, 6 Drawing Sheets

(56) References Cited

U.S. PATENT DOCUMENTS

| | | | |
|---|---|---|---|
| 8,205,059 B2* | 6/2012 | Wu | G06F 3/0605 710/11 |
| 8,244,935 B2* | 8/2012 | Leventhal | G06F 3/0613 369/47.14 |
| 8,375,194 B2 | 2/2013 | Shah et al. | |
| 8,438,362 B2 | 5/2013 | Mukherjee et al. | |
| 9,448,728 B2 | 9/2016 | Shaikh et al. | |
| 9,898,226 B2 | 2/2018 | Miller et al. | |
| 2006/0047999 A1* | 3/2006 | Passerini | G06F 11/1458 714/6.12 |
| 2006/0190697 A1* | 8/2006 | Grant | 711/170 |
| 2006/0265568 A1* | 11/2006 | Burton | G06F 12/0862 711/216 |
| 2006/0294333 A1* | 12/2006 | Michaylov | G06F 9/466 711/168 |
| 2008/0086619 A1* | 4/2008 | Traister | G06F 12/0269 711/170 |
| 2009/0125681 A1* | 5/2009 | Makita | G11B 27/002 711/114 |
| 2009/0187705 A1* | 7/2009 | Bernardi | G06F 3/0613 711/112 |
| 2010/0088480 A1 | 4/2010 | Hu | |
| 2010/0153617 A1* | 6/2010 | Miroshnichenko | G06F 3/061 711/6 |
| 2011/0197022 A1* | 8/2011 | Green et al. | 711/112 |
| 2011/0231594 A1* | 9/2011 | Sugimoto | G06F 3/0616 711/103 |
| 2012/0084484 A1* | 4/2012 | Post | G06F 3/061 710/308 |
| 2012/0131265 A1* | 5/2012 | Koltsidas et al. | 711/103 |
| 2012/0151245 A1* | 6/2012 | Chang | G06F 17/30227 714/4.1 |
| 2012/0198152 A1* | 8/2012 | Terry | G06F 11/1092 711/114 |
| 2012/0216074 A1* | 8/2012 | Chang | G06F 17/30227 714/19 |
| 2012/0226864 A1* | 9/2012 | Rushworth et al. | 711/118 |
| 2012/0246405 A1* | 9/2012 | Schroeder | G06F 12/0866 711/118 |
| 2014/0115293 A1 | 4/2014 | Taylor | |

* cited by examiner

FIG. 1

TRANSACTION GROUP (TXG)

| OPERATION | BLOCKS |
|---|---|
| FREE | 20-25 |
| WRITE | 100-110 |
| WRITE | 50-58 |
| FREE | 70-76 |
| FREE | 28-30 |
| FREE | 27 |
| FREE | 26 |
| FREE | 40 |

APPARATUS, SYSTEM AND METHOD FOR MANAGING SPACE IN A STORAGE DEVICE

CROSS REFERENCE TO RELATED APPLICATIONS

This application claims priority under 35 U.S.C. § 119(e) to provisional application No. 61/716,208 titled "Apparatus, System and Method for Managing Space in a Storage Device" filed on Oct. 19, 2012, which is hereby incorporated by reference herein.

TECHNICAL FIELD

Aspects of the present disclosure relate generally to storage systems, and in particular, to a method and system for a faster file system access.

BACKGROUND

As the number of computing devices increase across society, electronic data management has become increasingly challenging. Modern devices create and use ever increasing amounts of electronic data ranging from digital photos and videos, to large data sets related to any number of topics including energy exploration, human resources, seismic activity, and gene research. This explosion in digital data has naturally led to ever increasingly large amounts of data that must be stored. Correspondingly, the data storage field is under constant pressure to increase size, performance, accessibility, reliability, security, and efficiency of data storage systems.

In recent years, disk access speed has become one of the major bottlenecks that greatly affect performance of many of today's input/output (I/O) intensive applications. More specifically, the applications that require a high volume of I/O throughput have been slowed down by disk drives that have lagged behind CPU performance, leading to higher latencies, decrease in response times and I/O bottlenecks. The use of a disk cache is one way of improving performance of storage devices when disk drive access speed poses a concern as the information from the disk cache can be made more readily available to the outside application due to their higher speed access as compared to a typical storage device.

In addition to using a disk cache, management of the storage space in the storage devices is yet another method that may be used to improve storage device performance. In particular, efficient management of the allocated and free space in storage devices is one specific area that is considered important to achieving the desired improvement. One technique that is currently being used to increase file system access and thus improve storage device performance involves the use of space maps to keep track of both allocated and free space. In contrast to widely used bitmap techniques, which require long random seeks on a disk to locate free space, space maps provide a very compact way of presenting the allocated and free space information of the file system. The reduction in the seek time afforded by the space maps leads to faster file system operations and in turn an increase in file system access speed.

Although a file system keeps track of allocated and free space, typically it has no control over the memory blocks that are being freed. Generally, numerous discontiguous blocks of memory may be freed at any given time. The random location of blocks that are being freed, however, may make subsequent reallocation of the free space inefficient, especially when large blocks of data need to be written to the storage device or when a storage device requires that large segments of memory be available before they are reallocated. One method that is currently used to accommodate large blocks of data or to meet the storage device requirements is to have the storage device move data around and compact it before new data is written to the storage device. This approach, however, is inefficient and can decrease performance of the storage devices. Thus, with these issues in mind, among others, there is a need for a system that can aggregate information on contiguous blocks of free space and provide this information to the storage device in order to make reallocation more efficient and thereby increase file system access speed, among other advantages.

SUMMARY

One aspect of the present disclosure involves a system for managing free space in storage devices. The system including at least one processor operable to receive and process requests to free memory blocks in various storage devices. In particular, the system is operable to identify and aggregate contiguous ranges of freed block using the information received on the location of the memory blocks that are being freed. The system is further operable to relay the aggregated block information to the storage devices. In particular, the system is operable to send a command to the storage devices to unmap memory blocks that were determined to form contiguous segments of freed memory space thereby making the storage device aware of the availability of large segments of memory blocks for reallocation.

Aspects of the present disclosure may also involve a method of managing free space in storage devices. The method including the operation of receiving requests to free memory blocks in various storage devices and identifying and aggregating a contiguous segments of freed block using the received information. Finally, the method also involves sending a command to the storage device to unmap the contiguous segments of memory blocks thereby making the device aware of the availability of the freed segments for future reallocation.

BRIEF DESCRIPTION OF THE DRAWINGS

Exemplary embodiments are illustrated in referenced figures of the drawings. It is intended that the embodiments and figures disclosed herein are to be considered illustrative rather than limiting. The use of the same reference numerals in different drawings indicates similar or identical items.

DETAILED DESCRIPTION

Aspects of the present disclosure involve a storage system that is configured to improve file system access speeds by providing notification to storage devices located within the storage system of the presence of large collections of free space available for reallocation. In one particular aspect, the system involves providing a more efficient method for managing free space in the storage system, and related apparatus and methods. The system discussed herein may also involve freeing blocks of memory that are no longer in use based on the information stored in a file system. In particular, the system may allow for reclaiming large segments of free memory blocks, which may occur at one time, by aggregating information on the blocks that were being freed and providing the information on the aggregated blocks to the storage devices.

Aspects of the present disclosure involve providing commands to storage devices, and particularly providing direct commands to solid state drive (SSD) devices that are part of the storage system. In one implementation, information on the location of free blocks may be sorted to identify large contiguous segments of free blocks. The identified segments of free blocks may then be used to provide the system with a more efficient way to make the blocks available for subsequent allocations. In one specific arrangement, an UNMAP command may be issued to an SSD device (or devices) that actively tells the SSD device that it has a large block of available free space. The result is that the SSD device can write data, and specifically large blocks of data to the free space, and avoid excessive seeks and inefficient operations if the same data had been written in a non-contiguous large block.

Freeing of memory blocks in accordance with the method described herein provides several advantages. First, it allows the storage device to reclaim contiguous ranges of blocks which helps to improve the lifespan and performance of the device. Second, the need to move and compact data may be eliminated making the device more efficient. Finally, aggregating and freeing blocks in segments helps to reduce number of operations that need to be executed by the file system, leading to more efficient and faster reallocation. These and other advantages will be recognized from the discussions set out herein.

Figure 1:
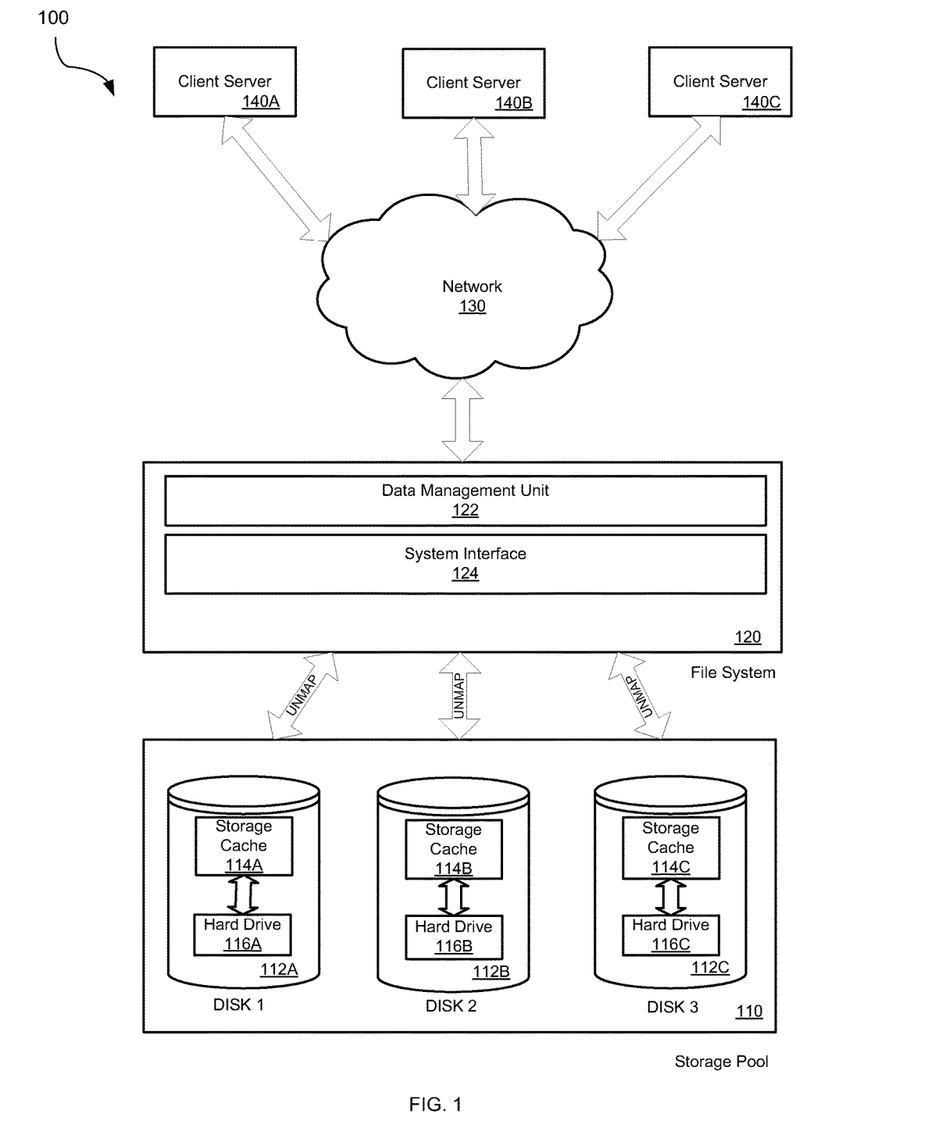
FIG. 1 is a schematic diagram illustrating an exemplary operating environment in accordance with one embodiment.

For a more detailed discussion of an exemplary environment that provides a more efficient file system access and interaction with storage, reference is now made to FIG. 1. In general, the system 100 includes a storage pool 110 in which data may be stored and a file system 120 that manages data within the storage pool. For example, the storage pool along with the files system may be a part of a storage appliance, such as SUN ZFS Storage Appliance designed by Sun Microsystems® and offered by Oracle. The system may also include client servers 140 that execute a number of applications and the network 130 through which requests from the client servers (and applications running thereon) are sent to the file system for execution on the storage pool. As shown in FIG. 1, the storage pool 110 may further include a plurality of storage disks 112. Each storage disk may in turn include a separate storage cache 114, also referred to as a "disk cache" or "transaction cache" and a more persistent and stable storage 116, such as a hard drive. The disk cache may be, for example, DRAM, SSD, or combination thereof or any other suitable cache. The persistent and stable storage may be, for example, spinning disks, SSD, or any other suitable storage capable of permanently retaining data.

The file system 120 may include a data management unit 122 and a system interface 124. The file system may be any conventional file system, such as a ZFS file system. The file system communicates with the storage pool via the system interface. The data management unit provides mechanism for the retrieval and storage of data received from the client servers. In particular, the data management unit provides for the creation or deletion of files, reading or writing of data, renaming files, etc., by issuing various commands to the storage devices. More specifically, the data management unit manages data access, as well as allocation and freeing of space in the storage devices.

As shown in FIG. 1, the storage pool 110 is typically accessed by the outside applications located on the client servers through the network 130. In particular, the storage pool processes request received from the file system indicating the types of operations that are to be performed on behalf of the client applications. Thus, for example, in the event that any of the client applications request writing a new file to storage or updating an existing file, the file system issues a write command to the storage pool specifying the allocation of new blocks of memory for the new file or updating new data to certain memory blocks associated with the existing file. In particular, the file system provides information to the storage pool regarding the number of memory blocks that are to be allocated, updated or freed (deleted) for each file in a file system.

Figure 2:
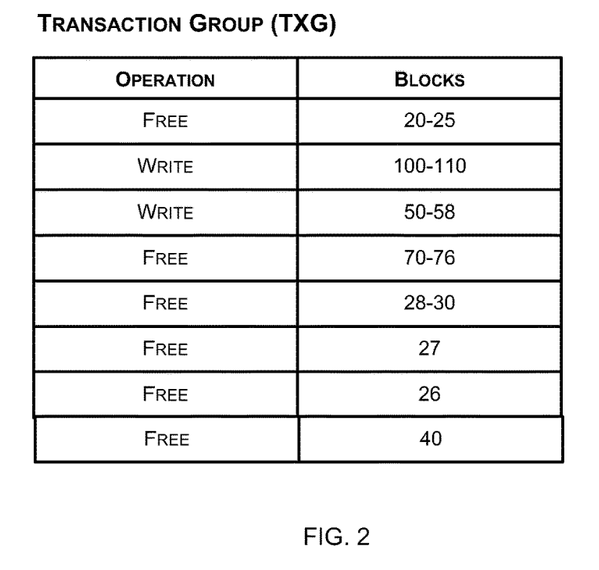
FIG. 2 is an exemplary data structure used for storing information on the allocated and free space sent to the storage device.

Depending on the implementation all write operations along with the real data and/or metadata, may be encapsulated by the file system into transactions. A number of transactions may subsequently be grouped together in a transaction group before being sent to storage. In particular, as shown in FIG. 2, all writes and frees that occurred in the files in any given pool of file systems during a predefined time may be grouped together. For example, all writes and frees that occurred during a 5 second period may be collected in one transaction group. Once the transaction group is closed, such that no additional transactions are accepted for the transaction group, the transaction group is sent to the storage device for execution.

The transaction group arriving at the storage device is first stored in a disk cache that is associated with the storage device in which the data is to be permanently stored. A cache synchronization command may be subsequently issued to synchronize the storage cache with a more persistent and stable storage. In particular, data and/or metadata for each transaction in a transaction group is transferred (moved) to the long term storage during the synchronization process. In other words, the long term storage is updated with the modified user data and/or filesystem metadata. Following the synchronization process and upon receiving an appropriate command from the file system, the space in the storage cache may become once again available to the file system in order to accommodate more data from any subsequent transactions. According to one embodiment, data from the storage write caches may be synchronized (transferred) every few seconds.

Figure 3:
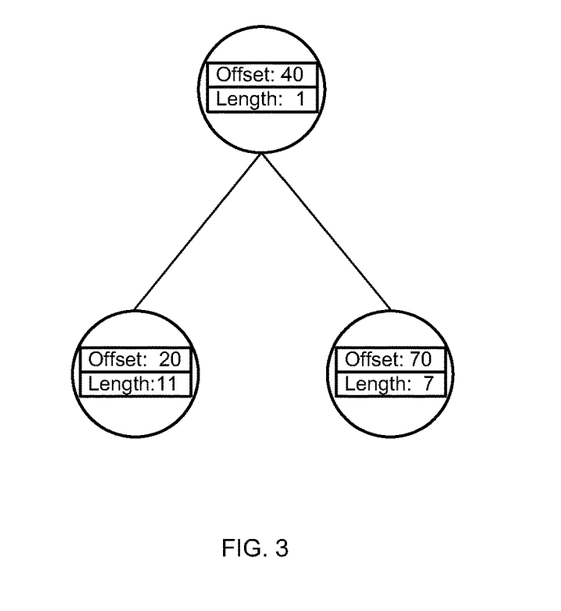
FIG. 3 is an exemplary data structure of an in-memory representation of allocated and free blocks in a storage device according to the present disclosure.

In order to ensure that the system has an accurate representation of all the allocated and free space, information on all the newly allocated and freed space for each transaction included in a given transaction group may be used to update an in-memory representation of the allocated and free blocks for a given storage device. In particular, two space maps, also referred to as an "allocation map" and a "free map,"

associated with each storage device may be updated so that they include a most up-to-date representation of allocations and frees in time order. According to one embodiment, the update of the in-memory representation of the allocated and free blocks may take place, for example, prior to sending the transaction group to the storage device In one particular implementation, the "free map" may be created by aggregating information on contiguous blocks of memory that are being freed. In particular, information stored in each "free map" may be sorted to determine the presence of any large contiguous blocks that are being freed. More specifically, any blocks that were individually freed in a transaction group, but together with other freed blocks or block ranges form a contiguous range of blocks, may be aggregated into one large segment of free blocks. Thus, for example, a "free map" that includes information on the blocks that are being freed by block starting position (i.e. offset) and the block length that specifies the number of contiguous physical blocks that are being freed following and including the starting block, may be sorted by the block starting offset. More specifically, each time information on a newly freed block or block segments is inserted into the "free map" from a transaction group, the "free map" may be first analyzed to determine if the new block or block ranges may be merged with any of the previously stored blocks or block ranges to form a large contiguous range of free blocks. In other words, as a part of the insertion process a determination is first made if the block or block segments being inserted can be merged with any adjacent range of blocks. Thus, for example, information from a transaction group that includes a request to free blocks 20-25, 70-76, 28-30, 26, 27 and 40 would be recorded in a "free map" as shown in FIG. 3.

Furthermore, information on recently freed memory space included in the transaction group may also be used to retain data stored in the just freed memory blocks for a certain period of time before it is made available for reallocation. In particular, the system may temporarily retain data located in the freed space in case data that is being stored becomes corrupted. In other words, instead of immediately releasing blocks that were specified as free in a transaction group for reallocation, the system may hold on to the data stored in these memory blocks for some period of time until it is determined that there is no further use for the data. For example, the system may hold on to the last two transaction groups worth of free space (e.g., about 20 seconds) before allowing the free space to be reallocated. This provides the system with an ability to rewind a pool experiencing data corruption back to the point before the corruption occurred. In other words, the system may return to the last known good state.

According to one embodiment, an in-memory representation of freed blocks, also referred to as "defer map," may be used for the purpose of retaining data in the freed memory blocks. In particular, a defer map may be used to store information on the blocks or ranges of blocks that are indicated as being free in each transaction group, but which should not be immediately reallocated. According to one embodiment, one defer map may be created for each transaction group and at any point in time a list of all the blocks or ranges of blocks that were freed in the last two transaction groups may be stored. Similarly to the "free map," the defer map may be a data structure, such as for example an AVL tree in which information on the block or the range of blocks that is being freed is stored in a form of an extent that includes both the offset and the length of each block or the range of blocks that is being freed. According to one embodiment, the "defer map" may be constructed using the information from the previously updated "free map."

In addition to keeping track of all the allocated and free space, aspects of the present disclosure actively instruct or otherwise communicate the availability of large segments of free space when certain types of storage devices, such as for example SSD devices, are used. For example, an SSD device may need at least 2 MB-4 MB blocks of free space before it can reclaim and reuse the space. Conventionally, the SSD has to rearrange data to free the needed contiguous blocks of free space. By providing the SSD device with the knowledge of the availability of large contiguous blocks of free blocks in advance, the present system and method eliminates the need for the SSD device to hunt and free space making the reallocation more efficient.

One method of actively communicating the availability of free chunks of space in an SSD device or any other device with similar requirements, is to invoke an UNMAP command. Because the UNMAP command determines and keeps track of the blocks that are being freed, issuing an UNMAP command provides the SSD device with information that allows it to more efficiently reallocate free blocks. In particular, when there is no longer a need for the data stored in certain locations on the SSD device, the UNMAP command provides the SSD with information on the location of the space that is available for it to reallocate. Depending on its implementation, the UNMAP command may be issued to either immediately clean (reallocate) the memory that is being freed or may be used after a predefined amount of time as discussed above.

Figure 4A:
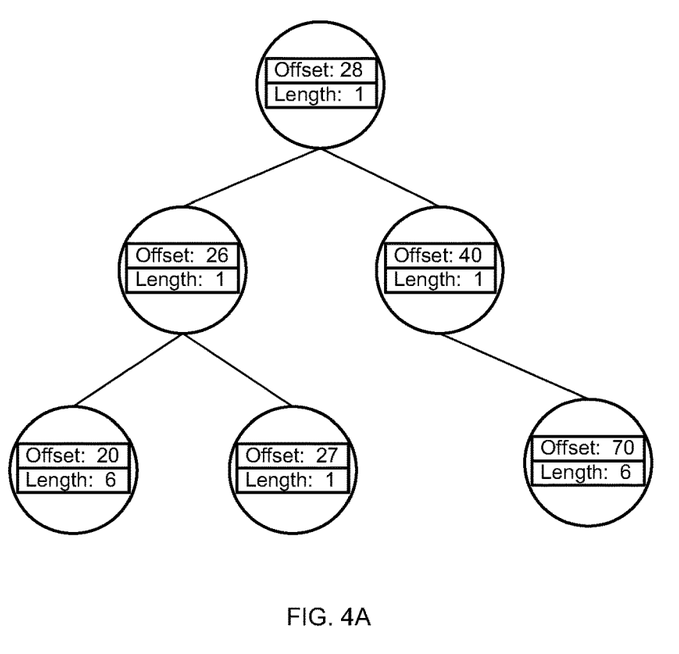
FIGS. 4A and 4B are exemplary data structures of an in-memory representation of free blocks according to the embodiments of the present disclosure.

According to one embodiment, the UNMAP command may be issued using information on the memory space that is being freed stored in "defer maps". In particular, the UNMAP operation may use individual entries from the defer maps to clean (de-allocate) the memory space. More specifically, the UNMAP command may be invoked with separate entries found in the "defer maps" that corresponds to discrete entries from each of the transaction groups. For example and referring to one specific example set out in FIG. 4A, when blocks 20-25, block 26, block 27, blocks 28-30, blocks 70-76 and 40 are specified as being free in a transaction group and stored in a "defer map" as separate entries, the UNMAP command may be used on each individual entry in the "defer map" to release the free memory blocks. In other words, number of UNMAP commands that are issued to communicate to the storage device that memory blocks are available for reallocation corresponds to the number of blocks or block segments that are specified as being freed in a transaction group.

Figure 4B:
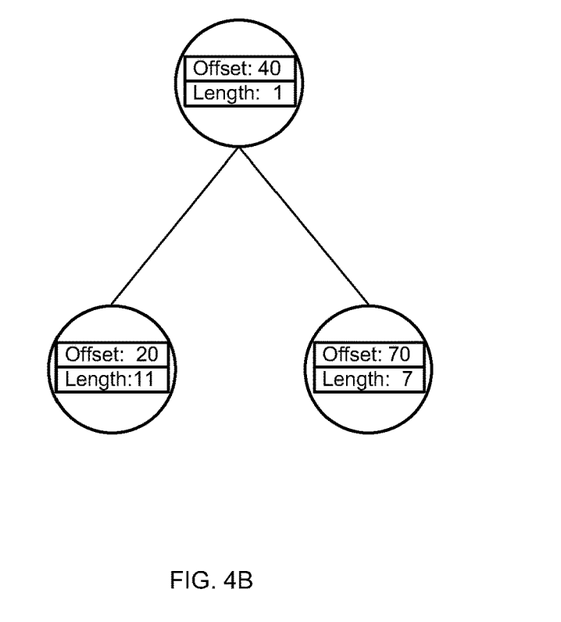

According to another embodiment, shown in FIG. 4B, the UNMAP command may also be issued on segments of aggregated blocks. In particular, the UNMAP command may be invoked once the separate memory blocks or segments of memory blocks that are being freed in each transaction group are aggregated into larger segments of contiguous memory blocks as described herein. Issuing of the UNMAP commands on the aggregated block segments in this manner allows to reduce the number of commands that need to be processed to release the freed block back to the system and thus makes the system more efficient.

Figure 5:
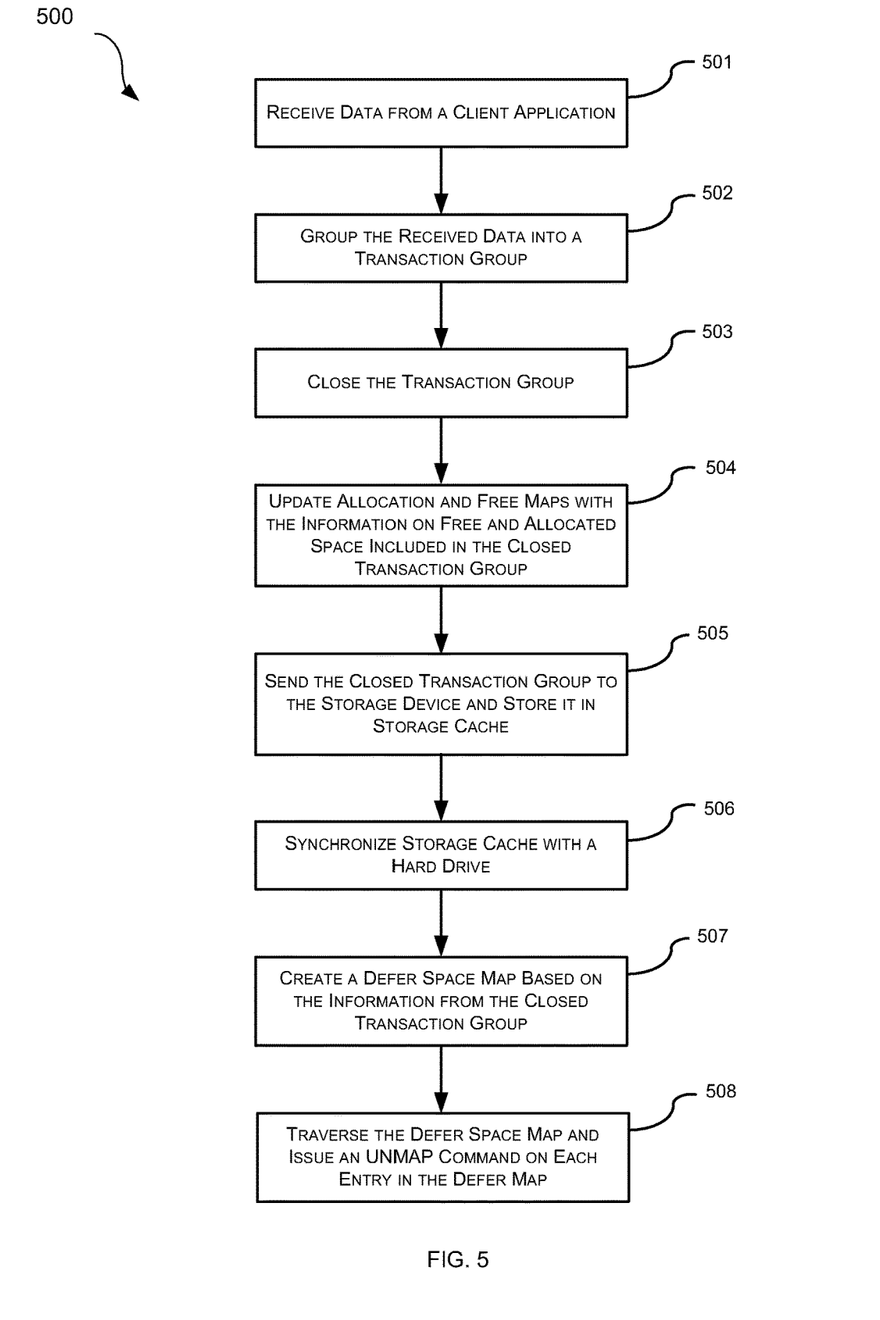
FIG. 5 is an exemplary flow diagram of releasing large segments of contiguous free blocks according to one embodiment.

Now discussion will turn to a method of using the disclosed system to release large segments of memory blocks in an efficient manner. In particular, reference will be made to FIGS. 5 and 6 to explain the steps involved in unmapping a number of contiguous free blocks of memory at one time, in order to improve the efficiency and speed of reallocating free space. As shown in FIG. 5, the following general steps might be executed to more efficiently reallocate free space in a storage device. Initially, data received from a client application (step 501) may be grouped into a transaction group (step 502) that include a number of writes and frees that are to be performed for certain files in a given file system. The transaction group is closed (step 503) after a pre-defined period of time, at which point allocation and free maps, which include a representation of all the allocations and frees in the storage may be updated with the information included in the transaction group (step 504). Next the transaction group may be sent to a storage device (step 505) where it is temporarily stored in a storage cache associated with the storage device in which data is to be store. In order to prevent data loss from a more volatile storage cache, the storage cache may be synchronized with a more persistent and stable storage (step 506). In a system that preserves data in the memory blocks for a predefined amount of time before it is reallocated, information on frees from the transaction group may also be stored in a defer map (step 507). Depending on the implementation, the freed ranges may be stored in the defer map as individual entries, with each entry representing a separate free block or range of blocks as specified in the transaction group. Alternatively, the freed ranges may be the aggregated contiguous range of free blocks with each entry in the defer map representing merged ranges of free blocks. Independent of the information stored in each entry of the defer map, an UNMAP command may be issued on each of the separate entries while traversing the defer map in order to release the freed space (step 508).

Figure 6:
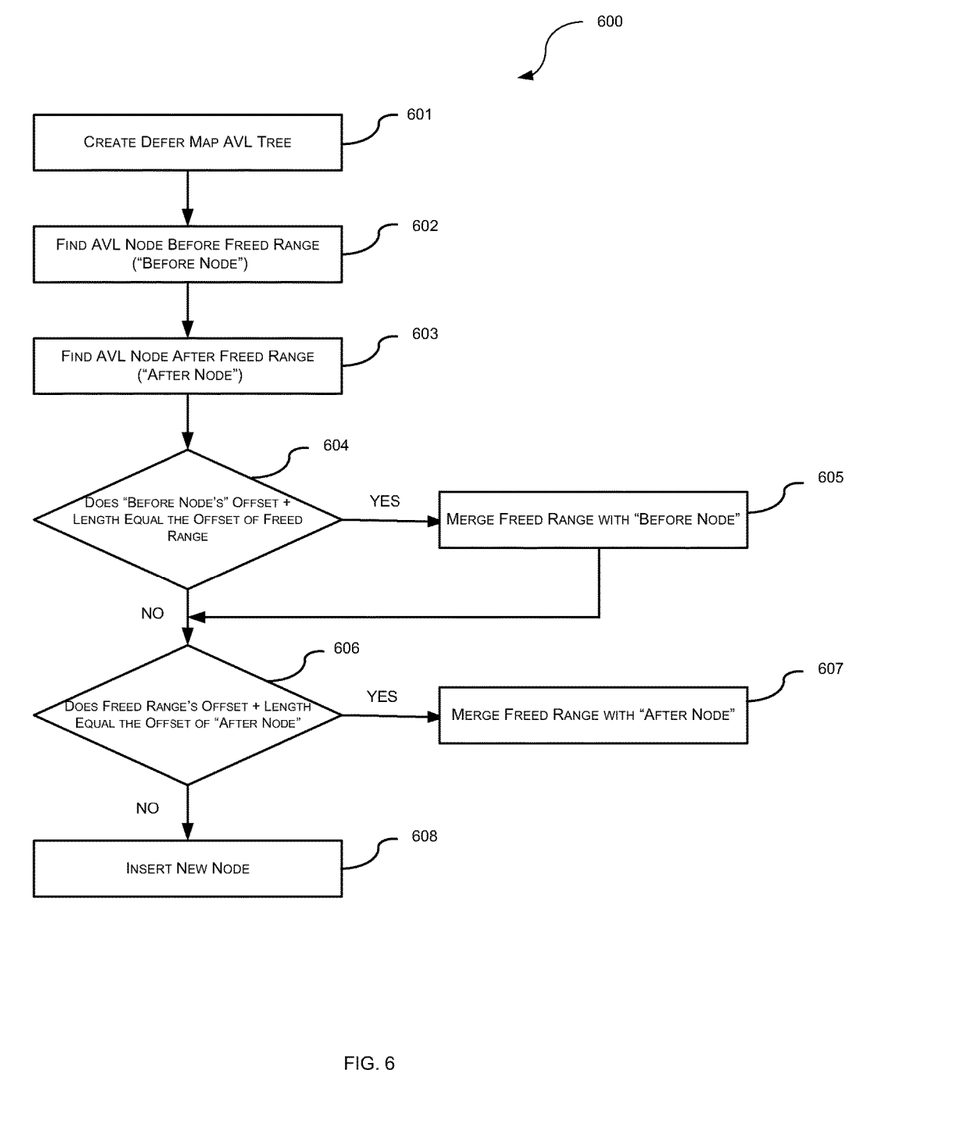
FIG. 6 is an exemplary flow diagram of the process for aggregating freed blocks into larger contiguous range according to one embodiment.

As shown in FIG. 6, the process of aggregating memory blocks or block segments designated as free in a transaction group into a large contiguous range of blocks may involve number of steps. To begin, a new free map, which may be an AVL tree, is created for each newly created transaction group (step 601). Each individual block or block segments that are freed in the transaction group are inserted into the free map AVL tree by executing the following steps. First, the AVL tree is traversed in order to locate an AVL node with a starting offset that is smaller than the starting offset of the freed range that is to be inserted into the tree ("before node") (step 602). Next, the AVL is traversed in order to locate an AVL node with a starting offset that is larger than the starting offset of the freed range ("after node") (step 603). At step 604 a determination is made if the starting offset plus the length of the block or block segment stored at the AVL "before node" equals to the offset of freed range. If the starting offset plus the length of the segment stored at the AVL "before node" is equal to the offset of freed range, the freed range is merged into the AVL "before node" by increasing the length in the "before node" to include the freed range. If, on the other hand, the starting offset plus the length of the segment stored at the AVL "before node" is not equal to the offset of freed range, a determination is then made if the starting offset plus the length of the freed range equals to the offset of the "after node" (step 606). Similarly, after the freed range is merged into the AVL "before node" a determination is next made if the starting offset plus the length of the freed range equals to the offset of the "after node" (step 606). If a determination is made at step 606 that the starting offset plus the length of the freed range equals to the offset of the "after node" the freed range is merged with the "after node, by decreasing "after node" offset to include the freed range (step 607). If, on the other hand, the offset plus length of the freed range is not equal to the offset of the "after node" a new node is inserted into the AVL tree (step 608) in which the information on the freed range is stored.

Figure 7:
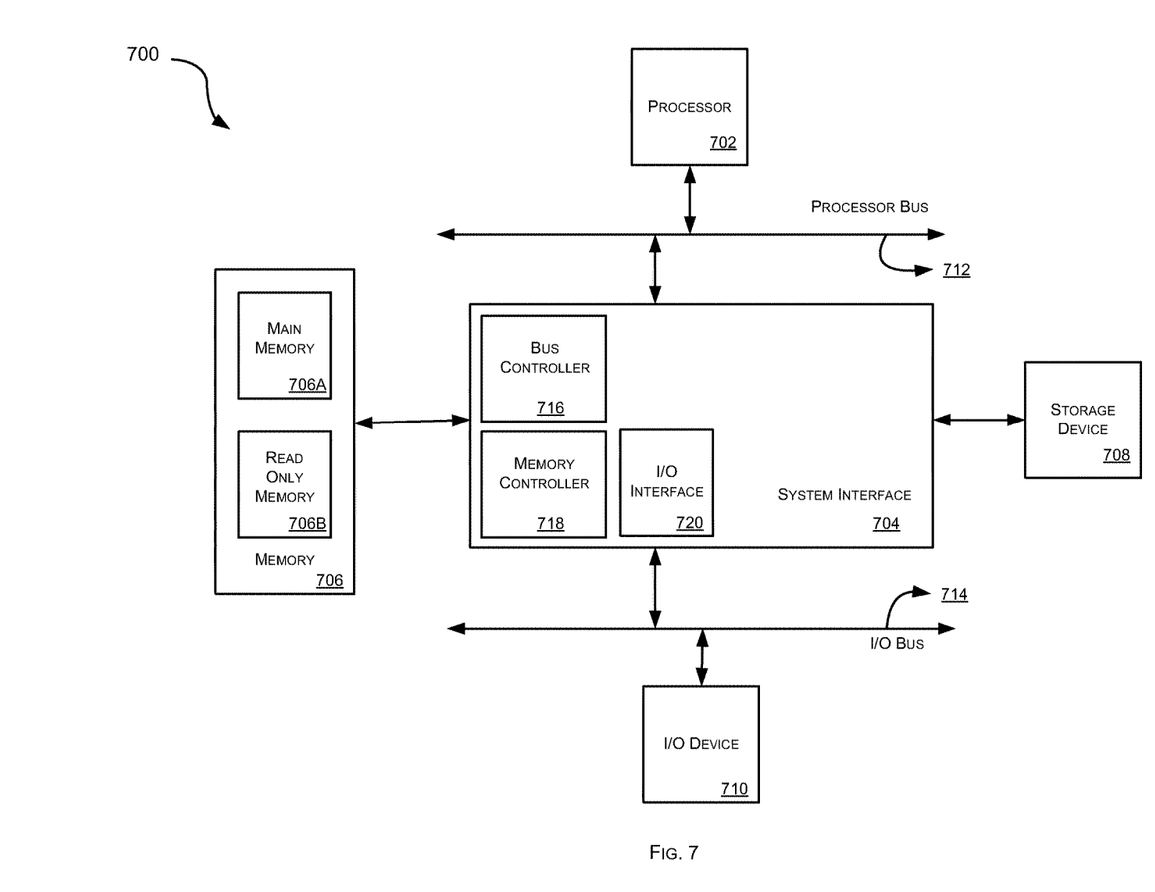
FIG. 7 is a block diagram illustrating an example of a computing system which may be used in implementing embodiments of the present disclosure.

FIG. 7 is a block diagram illustrating an example of a computing device or computer system 700 which may be used to implement the embodiments of a task processing disclosed above. As discussed herein embodiments of the present disclosure include various steps or operations which maybe performed by hardware components, software components or, in alternative embodiments, hardware components may be used in combination with the software instructions. According to the present example, the computing device or system 700 includes at least one processor 702, a system interface 704, a memory 706, a storage device 708 and at least one I/O device 710. The system 700 further includes a processor bus 712 and an input/output (I/O) bus 714.

Processor 702 may include one or more internal levels of cache (not shown) and can be any known processor. Processor bus 712, also known as the host bus or the front side bus, may be used to couple the processor 702 with the system interface 704. System interface 704 may be connected to the processor bus 712 to interface various components of the system with the processor 702. System interface 704 may, for example, include a bus controller 716 or bus interface unit to direct interaction with the processor bus 712 and a memory controller 718 for interfacing the memory 706 with the processor bus 712. System interface 704 may also include an I/O interface 720 to interface one or more I/O devices 710 with the processor 702.

Memory 706 typically includes one or more memory cards and control circuit (not shown). Memory 706 may include a main memory 706A and a read only memory (ROM) 706B. The main memory 706A can be Random Access Memory (RAM) or any other dynamic storage device(s) for storing information and instructions to be executed by the processor 702. Main memory 706A may be used for storing temporary variables or other intermediate information during execution of instructions by the processor 702. The read only memory 706B can be any static storage device(s) such as Programmable Read Only Memory (PROM) chip for storing static information and instructions for the processor.

According to one embodiment, the above methods may be performed by computer system 700 in response to processor 702 executing one or more sequences of one or more instructions contained in the main memory 706A. These instructions may be read into main memory 706A from another machine-readable medium capable of storing or transmitting information in a form (e.g., software, processing application) readable by a machine (e.g., a computer). Execution of the sequences of instructions contained in main memory 706A may cause processor 702 to perform the process steps described herein.

A machine-readable media may take the form of, but is not limited to, non-volatile media and volatile media. Non-volatile media may include a mass storage device 708 and volatile media may include dynamic storage devices. Common forms of machine-readable medium may include, but is not limited to, magnetic storage medium (e.g. floppy diskette); optical storage medium (e.g. CD-ROM), magneto-optical storage medium; read only memory (ROM); random access memory (RAM); erasable programmable memory (e.g., EPROM and EEPROM); flash memory; or other types of medium suitable for storing computer instructions.

Embodiments of the present disclosure include various steps, which are described in this specification. As discussed above, the steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

While the present disclosure has been described with reference to various embodiments, it will be understood that these embodiments are illustrative and that the scope of the disclosure is not limited to them. Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternative, modifications, and variations together with all equivalents thereof.

The invention claimed is:

1. A system for managing space in storage devices, the system comprising:
a storage device configured to store a plurality of memory blocks, the storage device including a storage cache;
at least one processor, located external to the storage device, with a file system operating thereon, operable to:
receive a set of requests from a client application over a time period, the time period having a duration, each request of the set of requests corresponding to an operation to free one or more memory blocks stored in the storage device, and each request of the set of requests identifying each of a location of the one or more memory blocks and a length of the one or more memory blocks;
segment the time period into one or more time segments, each time segment of the one or more time segments corresponding to a defined time interval;
for each time segment of the one or more time segments:
define a transaction group including a subset of the set of requests, each request of the subset having been received from the client application during the time segment, the transaction group being defined before the subset of requests is transmitted to the storage device;
generate a hierarchical data structure representing the subset of requests associated with the transaction group, the hierarchical data structure being defined by a hierarchy of a plurality of nodes including a first node and a second node, each node of the plurality of nodes representing a request of the subset of requests, and each node of the plurality of nodes including block data representing the location and the length of the one or more memory blocks that correspond to the request;
iteratively identify, for each node included in the hierarchical data structure, one or more memory blocks designated as free;
identify, based at least in part on the one or more memory blocks designated as free, each of at least one first memory block associated with the first node and at least one second memory block associated with the second node;
determine whether the at least one first memory block is adjacent to the at least one second memory block, the at least one first memory block being determined as adjacent to the at least one second memory block when the location and the length of the at least one first memory block equals to the location of the at least one second memory block;
modify the hierarchical data structure when the at least one first memory block is determined as being adjacent to the at least one second memory block, the modification including combining the first node and the second node into a single node representing a range of contiguous memory blocks, the location of the single node corresponding to the location of the at least one first memory block, and the length of the single node corresponding to the length of the at least one first memory block combined with the length of the at least one second memory block;
update, based at least in part on the modified hierarchical data structure, an in-memory representation of free blocks associated with the storage device; and
issue a command to the storage device to UNMAP the range of contiguous memory blocks at the storage device, the command being issued for each node of the modified hierarchical data structure, and receiving the command at the storage device causes the storage cache to be synchronized with the modified hierarchical data structure.

2. The system of claim 1, wherein the location of the one or more memory blocks that are being freed is provided in a form of an extent that includes an offset and the length, the offset defining a starting position of a particular block that is to be freed and the length defining a number of contiguous blocks following and including the particular block.

3. The system of claim 2, wherein the transaction group includes information on the locations of the memory blocks that are being freed during a predefined period of time.

4. The system of claim 1 wherein the command comprises a Small Computer System Interface (SCSI) UNMAP command to a Solid State Drive (SSD) device, the SSD device forming an input/output buffer of a hard disk, the hard disk forming a portion of a storage pool of a storage appliance.

5. The system of claim 1, further comprising aggregating adjacent or overlapping memory blocks, wherein aggregating includes comparing information on a location of a first memory block that is being freed to a location of a second memory block that is being freed and merging the first memory block and the second memory block in the range of contiguous blocks when the first and the second memory blocks overlap or are adjacent.

6. The system of claim 1, wherein the at least one processor is further operable to store information on the range of contiguous blocks that is being freed in a free map.

7. The system of claim 6, wherein the at least one processor is further operable to transfer and store the information stored in the free map to a defer map, and wherein the issuing of the command to unmap the range of contiguous blocks is performed using the information stored in the defer map.

8. A method for managing space in a storage device having a storage cache, the method comprising:
receiving, at a file system operating external to the storage device, a set of requests from a client application over a time period, the time period having a duration, each request of the set of requests corresponding to an operation to free one or more memory blocks stored in the storage device, and each request of the set of requests identifying each of a location of the one or more memory blocks and a length of the one or more memory blocks;

segmenting the time period into one or more time segments, each time segment of the one or more time segments corresponding to a defined time interval;

for each time segment of the one or more time segments:
defining a transaction group including a subset of the set of requests, each request of the subset having been received from the client application during the time segment, the transaction group being defined before the subset of requests is transmitted to the storage device;
generating a hierarchical data structure representing the subset of requests associated with the transaction group, the hierarchical data structure being defined by a hierarchy of a plurality of nodes including a first node and a second node, each node of the plurality of nodes representing a request of the subset of requests, and each node of the plurality of nodes including block data representing a request of the subset of requests and is associated with the location and the length of the one or more memory blocks that correspond to the request;
iteratively identifying, for each node included in the hierarchical data structure, one or more memory blocks designated as free;
identifying, based on at least in part on the one or more memory blocks designated as free, each of at least one first memory block associated with the first node and at least one second memory block associated with the second node;
determining whether the at least one first memory block is adjacent to the at least one second memory block, the at least one first memory block being determined as adjacent to the at least one second memory block when the location and the length of the at least one first memory block equals to the location of the at least one second memory block;
modifying the hierarchical data structure when the at least one first memory block is determined as being adjacent to the at least one second memory block, the modification including combining the first node and the second node into a single node representing a range of contiguous memory blocks, the location of the single node corresponding to the location of the at least one first memory block, and the length of the single node corresponding to the length of the at least one first memory block combined with the length of the at least one second memory block;
updating, based at least in part on the modified hierarchical data structure, an in-memory representation of free blocks associated with the storage device; and
issuing a command to the storage device to UNMAP the range of contiguous memory blocks at the storage device, the command being issued for each node of the modified hierarchical data structure, and receiving the command at the storage device causes the storage cache to be synchronized with the modified hierarchical data structure.

9. The method of claim 8 wherein the location of the memory blocks that are being freed is provided in a form of an extent that includes an offset and the length, the offset defining a starting position of a particular block that is to be freed and the length defining a number of contiguous blocks following and including the particular block.

10. The method of claim 9 wherein the transaction group including information on the locations of memory blocks that are being freed during a predefined period of time.

11. The method of claim 8 wherein the command comprises a Small Computer System Interface (SCSI) UNMAP command to a Solid State Drive (SSD) device, the SSD device forming an input/output buffer of a hard disk, the hard disk forming a portion of a storage pool of a storage appliance.

12. The method of claim 8 further comprising aggregating adjacent or overlapping memory blocks, wherein aggregating includes comparing information on a location of a first memory block that is being freed to a location of a second memory block that is being freed and merging the first memory block and the second memory block in the range of contiguous blocks when the first and the second memory blocks overlap or are adjacent.

13. The system of claim 1, wherein:
each of the nodes comprises an offset indicating a location of a first memory block being freed and the length indicating a number of contiguous memory blocks being freed including the first memory block; and
the nodes are arranged within the hierarchical data structure according to the offset of each of the nodes.

14. The system of claim 13, wherein the at least one processor is further operable to:
receive a request of the set of requests, the request comprising an offset and a length of a requested group of memory blocks to be freed;
traverse the hierarchical data structure to identify a first node having a largest offset less than the offset of the requested group of memory blocks and a second node having a smallest offset greater than the offset of the requested group of memory blocks;
merge the request with the first node in response to the requested group of memory blocks forming a contiguous range of memory blocks with the first node and not the second node;
merge the request with the second node in response to the requested group of memory blocks forming a contiguous range of memory blocks with the second node and not the first node;
merge the first node, the second node, and the request in response to the requested group of memory blocks forming a contiguous range of memory blocks with the first node and the second node; and
insert the request as a separate node in the hierarchical data structure according to the offset of the request in response to the requested group of memory blocks not forming a contiguous range of memory blocks with the first node or the second node.

15. The method of claim 8, wherein:
each of the nodes comprises an offset indicating a location of a first memory block being freed and the length indicating a number of contiguous memory blocks being freed including the first memory block; and
the nodes are arranged within the hierarchical data structure according to the offset of each of the nodes.

16. The method of claim 15, further comprising:
receiving a request of the set of requests, the request comprising an offset and a length of a requested group of memory blocks to be freed;
traversing the hierarchical data structure to identify a first node having a largest offset less than the offset of the requested group of memory blocks and a second node having a smallest offset greater than the offset of the requested group of memory blocks;

merging the request with the first node in response to the requested group of memory blocks forming a contiguous range of memory blocks with the first node and not the second node;

merging the request with the second node in response to the requested group of memory blocks forming a contiguous range of memory blocks with the second node and not the first node;

merging the first node, the second node, and the request in response to the requested group of memory blocks forming a contiguous range of memory blocks with the first node and the second node; and inserting the request as a separate node in the hierarchical data structure according to the offset of the request in response to the requested group of memory blocks not forming a contiguous range of memory blocks with the first node or the second node.

* * * * *